C. T. HENDERSON & A. SIMON.
MOTOR CONTROL SYSTEM.
APPLICATION FILED MAY 24, 1915.
1,258,116.
Patented Mar. 5, 1918.
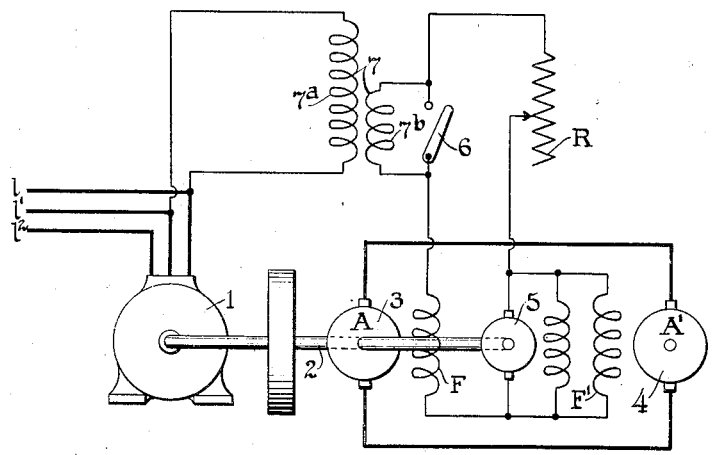
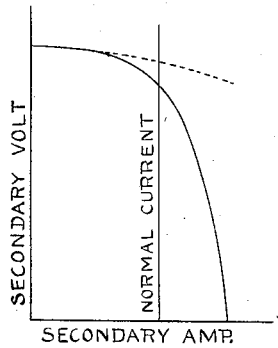
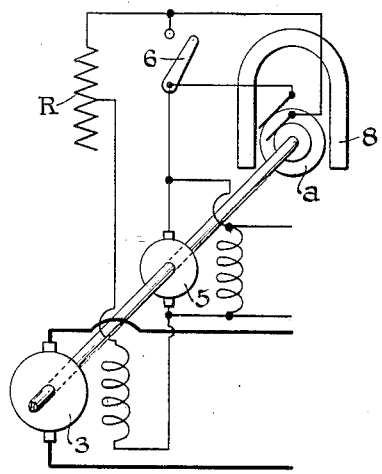
Inventors
Clark T. Henderson
Arthur Simon
By
Attorney

UNITED STATES PATENT OFFICE.

CLARK T. HENDERSON AND ARTHUR SIMON, OF MILWAUKEE, WISCONSIN, ASSIGNORS TO THE CUTLER-HAMMER MFG. CO., OF MILWAUKEE, WISCONSIN, A CORPORATION OF WISCONSIN.

MOTOR-CONTROL SYSTEM.

1,258,116.   Specification of Letters Patent.   Patented Mar. 5, 1918.

Application filed May 24, 1915. Serial No. 30,031.

*To all whom it may concern:*

Be it known that we, CLARK T. HENDERSON and ARTHUR SIMON, citizens of the United States, residing at Milwaukee, in the county of Milwaukee and State of Wisconsin, have invented new and useful Improvements in Motor-Control Systems, of which the following is a full, clear, concise, and exact description, reference being had to the accompanying drawing, forming a part of this specification.

This invention relates to improvements in motor control systems, although certain features thereof are applicable in other relations.

In systems wherein the controlled motor is supplied with power from a motor generator and is governed by field regulation of the generator, the residual magnetism of the generator field when disconnected from circuit has been found very objectionable, and it is one of the objects of this invention to provide simplified demagnetizing means for the generator field.

A further object is to provide demagnetizing means which may be connected in a permanently closed loop across the terminals of the generator field to thereby eliminate arcing upon deënergization of the field.

Other objects and advantages, as well as other applications of the invention, will be apparent from the embodiments thereof illustrated in the accompanying drawing.

In the drawing,

Figure 1 diagrammatically illustrates a control system employing a transformer for demagnetizing purposes;

Fig. 2 is a diagrammatic view showing the approximate voltage curve or characteristic of the transformer employed; and, Fig. 3 diagrammatically illustrates a part of the system of Fig. 1 with an inductor employed for demagnetizing purposes.

Referring to Fig. 1, the same illustrates a motor generator set including an alternating current motor 1 driving, through a flywheel shaft 2 the armature A of generator 3 which supplies current to the armature A' of a motor 4. Also, the system includes an exciter 5 driven by the machine 1 to supply current to the field windings F and F' of the generator 3 and motor 4 respectively. The field F of the generator is connected to the exciter through a suitable control switch 6 and a variable resistance R. To this extent the system is of conventional form and it will be understood that by varying the resistance R the output of the generator 3, and in consequence the action of the motor 4, may be controlled at will, while switch 6 affords means for including demagnetizing means in the circuit of the generator field to stop the motor 4.

The demagnetization of the field F of the generator is accomplished by connecting the same to a source of alternating current and as illustrated this source comprises a special transformer 7 having a primary winding $7^a$ connected across two lines of the supply source 1, 1', $1^2$ and a secondary winding $7^b$ connected in parallel with the control switch 6. More specifically, this transformer is of a special type, such as that disclosed in the patent to Thomas E. Barnum No. 1,098,549 of June 2, 1914, wherein provision is made for a magnetic leakage, such as to produce curve characteristics substantially as depicted in Fig. 2. In this figure the full line curve is representative of the characteristics of the special transformer while the dotted line curve, which is shown for comparison, is representative of the usual transformer. These characteristics enable short-circuiting of the secondary winding of the transformer and hence its connection in the system as illustrated and just described. The patent mentioned illustrates an auto-transformer wherein the secondary winding comprises a section of the primary winding but as will be understood the two windings may be independent as illustrated.

Considering now the operation of the system of Fig. 1 it will be apparent that when the switch 6 is closed to excite the generator field the transformer will be completely short-circuited and in consequence the system will function in the usual manner. On the other hand, when the switch 6 is opened the transformer will send an alternating current through the generator field and thereby quickly demagnetize the same. This in turn results in quickly checking the output of the generator and in consequence quickly bringing the controlled motor 4 to rest. This is assuming inclusion of the resistance R to weaken the field prior to opening of switch 6 for with the arrangement shown in the exciter will continue to supply direct current unless the circuit is entirely interrupted. However, with the resistance R included in circuit the direct current supplied to the field will be of such a low value as to render the magnetism of the field negligible.

Referring now to Fig. 3, the same diagrammatically illustrates an inductor 8 of conventional form having an armature $a$ operatively connected to the motor generator set to be driven thereby and having slip rings respectively connected to opposite sides of the control switch 6. As is understood the curve characteristics of the ordinary inductor are similar to those of the special transformer above discussed and such that its armature may be short-circuited without an excessive resultant current. The inductor will function in the same manner as the transformer above described.

As will now be apparent certain features of the invention may also be advantageously employed in other relations as, for example, in the control of solenoids and other windings where quick demagnetization is desired.

What we claim as new and desire to secure by Letters Patent is:—

1. In combination, a motor, a direct current generator for supplying power thereto, alternating current producing means connected in a closed loop with the direct current field winding of said generator and means to make and break a short circuit around said alternating current producing means.

2. In combination, a motor, a direct current generator for supplying power thereto, a source of direct current for separately exciting the field of said generator and demagnetizing means for the field of said generator comprising a device connected between the field of said generator and said direct current source, said means being adapted to be rendered ineffective by short circuiting thereof.

3. In combination, a motor, a generator for supplying power thereto, a direct current source for separately exciting the field of said generator and alternating current producing means connected in series with the field of said generator and located between the same and its source of direct current and short-circuiting means for said former means, said alternating current producing means when not short-circuited acting to demagnetize said field and when short-circuited being rendered ineffective.

4. In combination, a motor, a direct current generator for supplying power thereto, a source of direct current for exciting the field of said generator, a control switch between the field of said generator and said source and alternating current producing means in shunt with said switch, said means upon opening of said switch acting to demagnetize the field of said generator.

5. In combination, an electromagnetic winding, a source of direct current for energizing the same, and alternating current producing means included in circuit between said winding and said source to demagnetize the former, said means being adapted to be rendered ineffective by short-circuiting thereof.

6. In combination, an electromagnetic winding, a source of direct current therefor, a control switch between said winding and said source and an alternating current producing means in shunt with said switch, said means upon opening of said switch acting to demagnetize said winding and being rendered ineffective with respect to said winding by closure of said switch.

In witness whereof, we have each hereunto subscribed our names.

CLARK T. HENDERSON.
ARTHUR SIMON.